United States Patent [19]

Tom

[11] Patent Number: 4,661,575

[45] Date of Patent: Apr. 28, 1987

[54] DICYCLOPENTADIENE POLYMER PRODUCT

[75] Inventor: Glenn M. Tom, New Castle County, Del.

[73] Assignee: Hercules Incorporated, Wilmington, Del.

[21] Appl. No.: 839,258

[22] Filed: Mar. 13, 1986

Related U.S. Application Data

[63] Continuation-in-part of Ser. No. 672,424, Nov. 16, 1984, Pat. No. 4,584,425, which is a continuation-in-part of Ser. No. 497,918, May 25, 1983, Pat. No. 4,507,453, which is a continuation-in-part of Ser. No. 342,455, Jan. 25, 1982, abandoned.

[51] Int. Cl.$^4$ .............................................. C08F 32/06
[52] U.S. Cl. ..................................... 526/283; 585/827
[58] Field of Search ........................ 526/283; 585/827

[56] References Cited

U.S. PATENT DOCUMENTS 3,627,739 12/1971 Devlin ........................... 260/88.2 D
4,400,340 8/1983 Klosiewicz ......................... 526/283

Primary Examiner—Paul R. Michl
Attorney, Agent, or Firm—William S. Alexander

[57] ABSTRACT

A novel polymer product comprised of polymerized units of dicyclopentadiene and method of making the same as disclosed.

1 Claim, No Drawings

DICYCLOPENTADIENE POLYMER PRODUCT

This application is a continuation-in-part of application Ser. No. 672,424, filed Nov. 16, 1984, now U.S. Pat. No. 4,584,425, which was a continuation-in-part of application Ser. No. 497,918, filed May 25, 1983, now U.S. Pat. No. 4,507,453, which was a continuation-in-part of application Ser. No. 342,455, filed Jan. 25, 1982, now abandoned.

BACKGROUND OF THE INVENTION

This invention relates to novel polymer product compositions. In particular, it relates to a crosslinked, high modulus, high impact strength, thermoset polymer of dicyclopentadiene units which is formed via a metathesis-catalyst system.

A good thermoset polymer should meet at least two criteria. It should have desirable physical properties and it should lend itself to easy synthesis and forming. Among the most desirable physical properties for many polymers is a combination of high impact strength and high modulus. It is desirable that good impact strength be combined with a modulus of at least about 150,000 psi at ambient temperature. Thermoset polymers with high impact strength and high modulus find useful applications as engineering plastics in such articles of manufacture as automobiles, appliances and sports equipment. Among the critical factors in the synthesis and forming of a thermoset polymer are the conditions and time required to make the polymer set up or gel. Many thermoset polymers require considerable time, elevated temperature and pressure, or additional steps after the reactants are mixed before the setting is complete.

Not only is it desirable that the thermoset polymer have high impact strength, but it is also desirable that it be easily synthesized and formed. A reaction injection molding process achieves this second goal by in-mold polymerization. The process involves the mixing of two or more low viscosity reactive streams. The combined streams are then injected into a mold where they quickly set up into a solid infusible mass. For a reaction injection molding system to be of use with a particular polymer, certain requirements must be met: (1) the individual streams must be stable and must have a reasonable shelf-life under ambient conditions; (2) it must be possible to mix the streams thoroughly without their setting up in the mixing head; (3) when injected into the mold, the materials must set up to a solid system rapidly; and (4) any additives-fillers, stabilizers, pigments, etc., must be added before the material sets up. Therefore, the additives selected must not interfere with the polymerization reaction.

A thermoset homopolymer having high impact strength and high modulus has been described by Klosiewicz in U.S. Pat. No. 4,436,858 and by Leach in U.S. Pat. No. 4,458,037. Characteristics of thermoset polymers include insolubility in common solvents such as gasoline, naphtha, chlorinated hydrocarbons, and aromatics as well as resistance to flow at elevated temperatures.

Work has been done on the metathesis copolymerization of dicyclopentadiene with one or more other monomers to produce soluble copolymers. This copolymer formation has resulted in the production of unwanted insoluble by-products. U.S. Pat. No. 4,002,815, for instance, which teaches the copolymerization of cyclopentene with dicyclopentadiene, describes an insoluble by-product and suggests that the by-product could be a gel of a dicyclopentadiene homopolymer, but does not demonstrate that this is the case.

Some other work, usually in an attempt to produce soluble polymers, has been done on the metathesis polymerization of dicyclopentadiene. Japanese unexamined published patent applications KOKAI Nos. 53-92000 and 53-111399 disclose soluble polymers of dicyclopentadiene. Several syntheses of soluble polymers of dicyclopentadiene have produced insoluble by-products. Takata et al, J. Chem. Soc. Japan Ind. Chem. Sect., 69, 711 (1966), discloses the production of an insoluble polymerized dicyclopentadiene by-product from the Ziegler-Natta catalyzed polymerization of dicyclopentadiene; Oshika et al, Bulletin of the Chemical Society of Japan, discloses the production of an insoluble polymer when dicyclopentadiene is polymerized with $WCl_6$, $AlEt_3/TiCl_4$ or $AlEt_3/MoCO_5$; and Dall Asta et al, Die Makromolecular Chemie 130, 153 (1969), discloses an insoluble by-product produced when a $WCl_6/AlEt_2Cl$ catalyst system is used to form polymerized dicyclopentadiene.

In U.S. Pat. No. 3,627,739 (Devlin), dicyclopentadiene is gelled with unactivated catalyst and then heated for an hour.

Minchak and Minchak et al respectively in U.S. Pat. Nos. 4,002,815 and 4,380,617 each disclose polymerization of cycloolefins to form polymers which may be isolated by precipitation using an alcohol or by steam or hot water stripping. The polymers produced have inherent viscosities from about 0.1 to about 10 and are greater than 90% soluble in solvent. Minchak in U.S. Pat. No. 4,426,502 discloses bulk polymerization of cycloolefins by reaction injection molding in less than about 2 minutes using an organoammonium molybdate or tungstate catalyst.

DeWitt et al in U.S. Pat. No. 4,418,179 discloses impact modification of cycloolefins by polymerization using an organo-ammonium molybdate or tungstate catalyst in less than 2 minutes using reaction injection molding.

Oshika et al in the Bulletin of the Chemical Society of Japan, line 41, pages 211–217 (1968) discloses ring opening polymerization of norbornene and its derivatives by $MoCl_5$, $WCl_6$ and $ReCl_5$ catalysts. Dark crude polymer is obtained which is dissolved and reprecipitated with methanol.

U.S. Pat. No. 4,002,815 discloses the use of a metathesis-catalyst system which employs a dialkylaluminum iodide, an alkylaluminum diiodide or a mixture of trialkylaluminum compounds with elemental iodine to produce substantially gel-free copolymers of cyclopentene and dicyclopentadiene.

U.S. Pat. No. 4,069,376 discloses the use of a three component catalyst comprised of a soluble tungsten compound, a dialkylaluminum chloride or alkylaluminum dichloride, and a dialkylaluminum iodide or alkylaluminum diiodide to produce substantially gel-free norbornene-dicyclopentadiene copolymers.

U.S. Pat. No. 4,535,097 discloses a cellular crosslinked poly(dicyclopentadiene) which is made with a metathesis-catalyst system. The cellular polymer is made by injecting the catalyst system, which includes an alkylaluminum activator, into a reaction vessel which is preheated, preferably to a temperature from about 100° to about 125° C.

STATEMENT OF THE INVENTION

The thermoset cyclopentadiene homopolymer described herein is characterized by having a flexural modulus of at least 150,000 psi at ambient temperature, a notched Izod impact strength of at least about 1.2 ft. lb./in. notch, a plate impact resistance of at least about 5 ft. lb. and a percent swell in toluene of less than about 200%.

DETAILED DESCRIPTION OF THE INVENTION

Dicyclopentadiene can be polymerized in such a manner that the resulting product is a thermoset homopolymer having high impact strength and high modulus. The preferred monomer, is commercially available endo-dicyclopentadiene (3a,4, 7,7a tetrahydro-4,7-methano-1H-indene). The exo-isomer, while not commercially available, can be used just as well. The preferred commercially available material has a purity of 96 to 97% and should be purified further in order to prevent impurities from inhibiting the polymerization. The low boiling impurities fraction can be removed by stripping away several percent of the unsaturated four to six carbon atom volatiles, i.e., the volatiles distilled below 100° C. at about 90+3 torr absolute pressure. The monomer can then be purified even further by treatment with an absorbent such as molecular sieves, alumina or silica gel. Additionally, the water content of the starting material should be below about 100 ppm. The presence of water interferes with polymerization by hydrolysis of both the catalyst and the activator components of the catalyst system. Water can be removed by azeotropic distillation under reduced pressure.

The polymerization of the purified dicyclopentadiene is catalyzed by a two part metathesis-catalyst system. One part contains a tungsten catalyst, such as a tungsten halide or tungsten oxyhalide, preferably $WCl_6$, $WOCl_4$ or a mixture thereof. The other part contains an organometallic activator such as tetraalkyl tin or an alkylaluminum compound. The alkylaluminum compound can be a trialkylaluminum, an alkylaluminum dihalide or a dialkylaluminum halide where the alkyl group contains one to ten carbon atoms.

The tungsten containing catalyst is usually employed in solution with dicyclopentadiene monomer. The tungsten compound should first be suspended in a small amount of a suitable solvent. The solvent must not be susceptible to reacting with the tungsten compound. For instance, when a tungsten halide is employed the solvent must not be susceptible to halogenation. Examples of preferred solvents are benzene, toluene, xylene, chlorobenzene, dichlorobenzene, and trichlorobenzene. Sufficient solvent should be added so that the tungsten compound concentration is between about 0.1 and 1.0 mole per liter of solution.

The tungsten compound can be solubilized by the addition of a small amount of an alcoholic or a phenolic compound. Phenolic compounds are preferred. Suitable phenolic compounds include phenol, alkyl phenols, and halogenated phenols, with tert-butyl phenol, tert-octyl phenol and nonyl phenol being most preferred. The preferred molar ratio of tungsten compound/phenolic compound is from about 1:1 to about 1:3. The tungsten compound/phenolic compound solution can be made by adding the phenolic compound to a tungsten compound/organic solvent slurry, stirring the solution and then blowing a stream of a dry inert gas through the solution to remove any hydrogen chloride. Alternatively, a phenolic salt, such as a lithium or sodium phenoxide, can be added to a tungsten compound/organic solvent slurry, the mixture stirred until essentially all the tungsten compound is dissolved, and the precipitated inorganic salt removed by filtration or centrifugation. All of these steps should be carried out in the absence of moisture and air to prevent deactivation of the catalyst.

To prevent premature polymerization of the tungsten compound/monomer solution, which would occur within a matter of hours, from about 1 to about 5 moles of a Lewis base or a chelating agent can be added per mole of tungsten compound. Preferred chelants include acetylacetones, alkyl acetoacetates, where the alkyl group contains from one to ten carbon atoms; preferred Lewis bases are nitriles and ethers such as benzonitrile and tetrahydrofuran. The improvement in the stability and shelf-life of the tungsten compound/monomer solution is obtained whether the complexing agent is added before or after the phenolic compound. When purified cycloolefin, for example dicyclopentadiene, is added to this catalyst solution it forms a solution which is stable and has a shelf-life of several months. The other part of the metathesis-catalyst system comprises the activator, as described above, preferably dissolved in dicyclopentadiene monomer.

The period of time between mixing of catalyst, activator and monomer and the exotherm, which indicates the onset of exothermic polymerization is referred to as the "induction time". If an unmodified activator/monomer solution is mixed with the catalyst/monomer solution, the induction time is virtually nil and the polymerization will initiate spontaneously and instantaneously and the polymer can set up in the mixing head. The induction time can be increased by adding a reaction rate moderator to the activator/monomer solution. Ethers, esters, ketones and nitriles are examples of compounds which can act as moderators for the alkylaluminum compounds. Ethyl benzoate, butyl ether, or bis(2-methoxyethyl) ether are preferred. The induction time can be controlled by varying the specific amount of rate moderator used. The preferred ratio of the alkylaluminum to moderator is from about 1:1.5 to about 1:5 on a molar basis.

The induction time is also temperature dependent. As the temperature at which the reaction is carried out is increased the induction time will decrease. Consequently, to keep the induction time controlled at higher reaction temperatures a less active formulation of the metathesis catalyst system should be used. One way of reformulating the system is by choice of moderator. Other ways will be readily determinable by one skilled in the art.

What is ultimately required is that when the catalyst system's components are combined, the resulting cycloolefin (for example dicyclopentadiene) to tungsten compound ratio will be from about 500:1 to about 15,000:1 on a molar basis, preferably 2,000:1 and the dicyclopentadiene to alkylaluminum ratio will be from about 100:1 to about 2000:1 on a molar basis, preferably about 200:1 to about 500:1. To illustrate a preferred combination: sufficient dicyclopentadiene is added to a 0.5 molar tungsten containing catalyst solution prepared as described above, so that the final tungsten compound concentration is 0.007 molar. This corresponds to a dicyclopentadiene to tungsten compound ratio of 1000:1. Sufficient dicyclopentadiene is added to the diethylaluminum chloride (Et$_2$AlCl) solution, prepared as described above, so that the alkylaluminum concentration is 0.048M. This corresponds to a dicyclopentadiene to alkylaluminum ratio of 150:1. If these two streams are mixed in a 1:1 ratio, the final ratio of dicyclopentadiene to tungsten compound will be 2000:1, the final ratio of dicyclopentadiene to alkylaluminum will be 300:1 and the final ratio of tungsten compound to alkylaluminum will be about 1:7. The illustrated combination is not the lowest catalyst level at which moldings can be made, but it is a practical level that provides for excess catalyst if impurities in the system consume some of the catalyst components. A higher alkylaluminum level will not only increase costs and residual chlorine levels but may result in a less satisfactory cure. Too low a tungsten compound concentration results in incomplete conversion. A wide range of alkylaluminum activator to tungsten catalyst formulations produce substantially crosslinked polymer products which have good out-of-mold properties such as tear resistance, stiffness, residual odor, and surface properties.

In a preferred synthesis, the polymerized dicyclopentadiene is made and molded via the reaction injection molding process. The two parts of the metathesis catalyst system are each mixed with dicyclopentadiene, to form stable solutions which are placed in separate vessels. These vessels provide the source for separate streams. The two streams are combined in the mixing head of the reaction injection molding machine and then injected into a warm mold where they quickly polymerize into a solid, infusible mass. The invention is not intended to be limited to systems employing two streams each containing monomer. It will be obvious to one skilled in the art that there may be situations where it is desirable to have monomer incorporated in just one stream or to employ more than two streams where the additional streams contain monomer and/or additives.

These reaction streams are completely compatible with conventional reaction injection molding equipment. Metathesis-catalyzed polymerizations are known to be inhibited by oxygen so it is necessary to store the components under an inert gas but, surprisingly, it is not necessary to blanket the mold with an inert gas. Effective turbulent mixing is easy to achieve in the mixing head because the process involves low viscosity, low molecular weight, rapidly diffusing components. Typically the mixing heads have orifices about 0.032 inch in diameter and a jet velocity of about 400 ft./sec. After being combined, the mixture is injected into a mold maintained at about 35° to 100° C., preferably 50° to 70° C. The mold pressure is in the range of about 10 to 50 psi. A rapid exothermic reaction occurs as the poly(dicyclopentadiene) sets up. The mold can be opened in as little as 20 to 30 seconds after the combined streams have been injected. In this short time heat removal is not complete and the polymer is hot and flexible. The polymer releases readily from the mold and can be removed from the mold immediately while hot or after cooling. After the polymer has cooled it will become a rigid solid. The total cycle time may be as low as 0.5 minute.

The substantially crosslinked dicyclopentadiene polymer product has a flexural modulus of at least about 150,000 psi, a notched Izod impact resistance of at least about 1.2 ft. lb./in. notch and a plate impact strength of at least about 5 ft. lbs. and resistance to flow at temperatures up to at least 350° C. It is at least 85% and, more commonly, at least 95% insoluble in common solvents such as gasoline, naphthas, chlorinated hydrocarbons and aromatics.

An important property of the thermoset polymer, which gives rise to the cited desirable characteristics, is the extent to which it is crosslinked. An indication of the extent of crosslinking is provided by the polymer's swell value. Gel and swell are determined by a modified version of ASTM D-3616. The measurement is made after the polymer is immersed in refluxing toluene until equilibrium is reached. Percent swell is defined as swollen polymer weight minus initial polymer weight, divided by initial polymer weight times one hundred. It has been found that the polymerized cycloolefins of this invention have a swell value of less than about two hundred percent.

Various additives can be included to modify the properties of cycloolefin polymer product of the invention. Possible additives include fillers, reinforcing fillers, pigments, antioxidants, light stabilizers, plasticizers and polymeric modifiers. Because of the rapid polymerization time the additives must be incorporated before the dicyclopentadiene monomer sets up in the mold. It is often desirable that the additives be combined with one or both of the reactant streams before being injected into the mold. Fillers can also be charged to the mold cavity, prior to charging the reaction streams, if the fillers are such that the reaction stream can readily flow around them to fill the remaining void space in the mold. It is essential that the additives not adversely affect catalytic activity.

One class of possible additives is reinforcing agents or fillers. These are compounds which can increase the polymer's flexural modulus with only a small sacrifice in impact resistance. Possible fillers include glass, wollastonite, mica, carbon black, talc, and calcium carbonate. It is surprising that, in spite of the highly polar nature of the surfaces of some of these fillers, they can be added without appreciably adversely affecting the polymerization rate. As much as 75% by weight of additives based on the final product weight can be incorporated. The addition of fillers which have modified surface properties is particularly advantageous. The exact amount of a filler to be used in a particular situation will be easily determinable and will depend on the preferences of the practitioner. The addition of fillers also serves to decrease the mold shrinkage of the product. After a short post cure at 150° to 200° C. an unfilled product will shrink from about 3.0 to about 3.5% whereas adding 20 to 25 wt. % filler will decrease the shrinkage to 1.5 to 2% and adding 33 wt. % filler will further decrease shrinkage to about 1%.

Where the filler includes fine particles of a material which is substantially chemically inert in the polymerization reaction, this material is believed to act as a heat sink to absorb the exothermic heat of polymerization. In the presence of an effective amount (for example 10% by weight, of evenly distributed 1/16 inch long milled glass fibers or wollastonite particles) of chemically inert heat sink material the maximum temperature of polymerization is lowered. This is believed to extend the active life of the catalyst so that less percent residual monomer is left in the poly(dicyclopentadiene) product.

Similarly, low residual monomer polymer products are obtained by controlled reaction of cycloolefin monomer using tungsten compound catalyst and dialkylaluminum chloride activator in an activator to catalyst ratio within the range of from about 2.5:1 to about 6:1.

More preferably, the activator to catalyst ratio is from 2.5:1 to about 4:1. Most preferably, the activator to catalyst ratio is from about 3:1 to about 3.5:1 to obtain a polymer product having from about 0.3 to about 2.0% by weight residual monomer.

Flame retardant additives may be added to one or more of the monomer feed streams to form polymers which are resistant to burning. For example, on a weight basis a flame retardant mixture of 17 parts of N,N'-ethylene-bis-tetrabromophthalimide, 7 parts $Sb_2O_3$ and 8 parts $NH_4BF_4$ as the flame retardant mixture per 100 parts of dicyclopentadiene imparts a V-0 rating in the UL-94V burn test where UL is an abbreviation for Underwriters Laboratories when mixed with 0.05 parts $WCl_6$ and 0.15 parts of tri-n-octyl aluminum as described herein to form substantially crosslinked polymerized units of dicyclopentadiene. This represents effective flame retardation. The range of weight portions for effective flame retardation is from 8 to 20 parts of N,N'-ethylene-bis-tetrabromophthalimide, from 6 to 15 parts $NH_4BF_4$ and from 3 to 11 parts $Sb_2O_3$ per 100 parts of dicyclopentadiene.

Since polymerized dicyclopentadiene contains some carbon-carbon unsaturation it may be subject to oxidation. The product can be protected by the incorporation of as much as about 2.0 wt. % of a phenolic or amine antioxidant. Preferred antioxidants include 2,6-di-tert-butyl-p-cresol, N,N'-diphenyl-p-phenylene diamine and tetrakis [methylene(3,5-di-t-butyl-4-hydroxy cinnamate)]methane. While the antioxidant can be added to either or both streams, incorporation into the catalyst/monomer stream is preferred.

The addition of an elastomer can increase the impact strength of the polymer 5 to 10 fold with only a slight decrease in flexural modulus. The elastomer can be dissolved in one or both of the dicyclopentadiene streams. The amount of elastomer used is determined by its molecular weight and by the initial viscosity of the streams to which it is added. Amounts within the range of 1 to 10% by weight and preferably 5 to 10% by weight of the total stream can be used without causing an excessive increase in solution viscosity. An example of preferred elastomer is styrene-butadiene rubber made by solution polymerization. The addition of about 6% of this elastomer to a dicyclopentadiene stream increases the viscosity to about 300 cps. The streams cannot be so viscous that adequate mixing of the streams is not possible, but increasing the viscosity to between about 300 cps and 1,000 cps improves the mold filling characteristics of the combined streams. The elastomer is preferably added to both dicyclopentadiene streams so that the viscosities of two streams are similar. When the two streams have similar viscosities, more uniform mixing is obtained when the streams are combined. An increase in viscosity also reduced leakage from the mold and simplifies the use of fillers by decreasing the setting rate of solid filler materials. Useful elastomers can be unsaturated hydrocarbon elastomers such as, e.g., styrene-butadiene rubber, polyisoprene, polybutadiene, natural rubber, styrene-isoprene-styrene triblock rubber, styrene-butadiene-styrene triblock rubber, and ethylene-propylene diene terpolymers; or saturated such as polyisobutylene and ethylene-propylene copolymer. It is believed that a saturated elastomer forms a semi-interpenetrating network when present during the polymerization of a cycloolefin, such as dicyclopentadiene. Unsaturated elastomers are believed to form interpenetrating networks with the polymerized units of cycloolefin, such as dicyclopentadiene, when present during the polymerization of the monomer. In either case, little or none of the elastomer can be removed by extraction.

For use in forming substantially crosslinked thermoset polymers in reaction injection molding, dicyclopentadiene of high purity is required. The degree of purity of the dicyclopentadiene monomer may determine whether the polymerization proceeds at all and whether an acceptable polymer is formed if polymerization occurs.

The highest purity commercial grade of monomer, 97% by weight dicyclopentadiene, is unacceptable for polymerization without purification. Ninety-seven percent by weight dicyclopentadiene can be made acceptable for reaction injection molding use by distillation. For example, a column packed with 1-inch Intalox Saddles (10 to 12 theoretical trays) provides dicyclopentadiene purification with recovery of purified dicyclopentadiene of about 70 to 75% because the relative volatilities of some of the polymerization inhibitors appear to be very close to that of dicyclopentadiene. Purified dicyclopentadiene substantially completely polymerizes in about ¾ minute or less. Purified dicyclopentadiene is produced by nitrogen sparging 97% by weight dicyclopentadiene followed by treatment with alumina.

Although polymerization inhibitors in crude dicyclopentadiene are still not fully identified, suspected contaminants are polar compounds such as epoxides, alcohols, aldehydes, and some other oxygen-containing compounds. Oxygenated compounds have generally intermediate or high polarity and are adsorbed on alumina or in zeolites.

The major volatile impurities in the 97% pure commercial dicyclopentadiene are isoprene and cis/trans 1,3-pentadiene, which do not affect the polymerization, but are undesirable for a reaction injection molding process. The volatile compounds can be removed simply by stripping.

Adsorption, in both mixing contact and fixed bed (percolation), are used. The contact method consists of mixing the dicyclopentadiene to be purified with an adsorbent in a container with inert atmosphere under controlled time and temperature conditions. Agitation is accomplished by adding a magnetic stirring bar to the container. In the fixed bed method, the dicyclopentadiene is purified by passing it through a column packed with an adsorbent under controlled flow and temperature conditions.

One of the most effective adsorbents for dicyclopentadiene purifications is Linde 10A molecular sieve (Union Carbide Type 13X M.S.). This adsorbent rapidly turns to a dark chocolate brown color when 97% by weight dicyclopentadiene is added. Most of the dark color can be extracted from the molecular sieves by acetone or hexane. IR analyses indicated that the color extracts are composed mainly of oxygenated compounds and some unsaturated cis-olefin. Activated alumina is also effective in removing catalysis poisons from dicyclopentadiene.

EXAMPLES 1 AND 2

In Example 1 a 0.1M solution of a tungsten containing catalyst solution is prepared by adding 20 grams of $WCl_6$ in 60 ml of dry toluene under a $N_2$ atmosphere and then adding a solution of 8.2 grams of p-tert-butyl phenol in 30 ml of toluene. The catalyst solution is sparged overnight with nitrogen to remove the HCl generated by the reaction of WCl₆ with the p-tert-butylphenol. In this and in all the following examples, phenol is used as a shorthand for p-tert-butylphenol and for simplicity the solution is referred to as WCl₆/phenol. Then a 0.033M catalyst/monomer solution is prepared by mixing under nitrogen 10 ml of dicyclopentadiene, 0.07 ml of benzonitrile and 5 ml of the 0.1M catalyst solution. An activator/monomer solution is prepared by combining, under nitrogen, 8.6 ml of dicyclopentadiene, 0.1 ml of isopropyl ether and 0.36 ml of 1.0M diethylaluminum chloride (Et₂AlCl) in dicyclopentadiene.

Polymerization is accomplished by adding 1.1 ml of the 0.033M catalyst/monomer solution to 8.9 ml of the activator/monomer solution. Both solutions are initially at 25° C. They are vigorously mixed. After a brief induction period a sharp exotherm is observed. A solid, insoluble polymer is formed. The time that elapses until rapid polymerization begins and the total exotherm of the sample above the starting temperature are shown in Table 1.

In Example 2 the above procedure is repeated except that 0.36 ml of 1.0M EtAlCl₂ is used in place of Et₂AlCl to prepare the activator solution and the reaction is started at 40° C. A solid, insoluble polymer is formed. The results are shown in Table 1.

TABLE 1

|  | Example 1 | Example 2 |
| --- | --- | --- |
| Dicyclopentadiene | 72 mmol | 72 mmol |
| WCl₆/Phenol | 0.036 mmol | 0.036 mmol |
| Et₂AlCl | 0.36 mmol | — |
| EtAlCl₂ | — | 0.36 mmol |
| Benzonitrile | 0.04 mmol | 0.04 mmol |
| Isopropyl Ether | 0.72 mmol | 0.72 mmol |
| Initial Temperature | 25° C. | 40° C. |
| Time to Exotherm | 15 sec. | 445 sec. |
| Exotherm | 122° C. | 147° C. |

EXAMPLES 3–8

In Examples 3 through 8 the procedure described in Example 1 is repeated except that different moderators are added to the activator/monomer solution. In each example the ratio of moles of moderator to moles of Et₂AlCl is held constant at 2:1. In Example 3, di-n-butyl ether is added while in Example 4, diisopropyl ether is used. In Example 5, ethyl benzoate is used while in Example 6, phenylethyl acetate is added. In Example 7, diisopropyl ketone is added. Lastly, in Example 8, tetrahydrofuran is added. In each example, the initial temperature is 25° C. (+1° C.). Example 8 is the only case where a solid insoluble polymer is not obtained. The results are listed in Table 2.

TABLE 2

|  | Example 3 | Example 4 | Example 5 | Example 6 | Example 7 | Example 8 |
| --- | --- | --- | --- | --- | --- | --- |
| Dicyclopentadiene | 72 mmol | 72 mmol | 72 mmol | 72 mmol | 72 mmol | 72 mmol |
| WCl₆/Phenol | 0.036 mmol | 0.036 mmol | 0.036 mmol | 0.036 mmol | 0.036 mmol | 0.036 mmol |
| Et₂AlCl | 0.36 mmol | 0.36 mmol | 0.36 mmol | 0.36 mmol | 0.36 mmol | 0.36 mmol |
| Di-n-butyl ether | 0.72 mmol | — | — | — | — | — |
| Diisopropyl ether | — | 0.72 mmol | — | — | — | — |
| Ethyl benzoate | — | — | 0.72 mmol | — | — | — |
| Phenyl ethyl acetate | — | — | — | 0.72 mmol | — | — |
| Diisopropyl ketone | — | — | — | — | 0.72 mmol | — |
| Tetrahydrofuran | — | — | — | — | — | 0.72 mmol |
| Benzonitrile | 0.04 mmol | 0.04 mmol | 0.04 mmol | 0.04 mmol | 0.04 mmol | 0.04 mmol |
| Time to Exotherm | 42 sec. | 15 sec. | 60 sec. | 282 sec. | 160 sec. | no rxn. |
| Exotherm | 153° C. | 122° C. | 155° C. | 157° C. | 147° C. | — |

EXAMPLES 9–12

In Examples 9 through 12 the activator to catalyst ratios are varied. In Example 9, 0.88 ml of catalyst/monomer solution, described in Example 1 is added to 7.1 ml of dicyclopentadiene containing sufficient Et₂AlCl and di-n-butyl ether to give the composition listed in Table 3. In Example 10, 0.44 ml of the same catalyst/monomer solution as used in Example 9 is added to 7.5 ml of the same activator/monomer solution used in Example 9, to give the final composition listed in Table 5. In Example 11, 4.0 ml of a catalyst/monomer solution prepared by mixing 20 ml of dicyclopentadiene with 1.5 ml of a 0.1M WCl₆/phenol solution, is mixed with 4.0 ml of an activator/monomer solution. In this activator solution there is sufficient Et₂AlCl to give a dicyclopentadiene to alkylaluminum ratio of 100:1 and sufficient di-n-butyl ether to give a di-n-butyl ether to aluminum ratio of 2:1. In Example 12, 4.0 ml of the catalyst/monomer solution used in Example 11 is mixed with 2.0 ml of dicyclopentadiene and 2.0 ml of the activator/monomer solution used in Example 11. In each case a solid, insoluble polymer is formed. The results of these reactions showing a variation in the exotherms due to variations in the Al/W ratio are listed in Table 3.

TABLE 3

|  | Example 9 | Example 10 | Example 11 | Example 12 |
| --- | --- | --- | --- | --- |
| Dicyclopentadiene | 57.6 mmol | 57.6 mmol | 57.6 mmol | 57.6 mmol |
| WCl₆/Phenol | 0.029 mmol | 0.0145 mmol | 0.029 mmol | 0.029 mmol |
| Et₂AlCl | 0.29 mmol | 0.29 mmol | 0.29 mmol | 0.145 mmol |
| Di-n-butyl ether | 0.58 mmol | 0.58 mmol | 0.58 mmol | 0.29 mmol |
| Benzonitrile | 0.033 mmol | 0.016 mmol | 0.033 mmol | 0.033 mmol |
| Dicyclopentadiene/Al | 200 | 200 | 200 | 400 |
| Dicyclopentadiene/W | 2000 | 4000 | 2000 | 2000 |
| Al/W | 10/1 | 20/1 | 10/1 | 5/1 |
| Time to Exotherm | 50 sec. | 48 sec. | 33 sec. | 43 sec. |
| Exotherm | 153° C. | 120° C. | 145° C. | 168° C. |
| Percentage residual dicyclopentadiene in | 3.0 | 4.7 | 3.0 | 1.5 |

TABLE 3-continued

|  | Example 9 | Example 10 | Example 11 | Example 12 |
|---|---|---|---|---|
| polymer product |  |  |  |  |

EXAMPLES 13-15

In Examples 14-15 a small amount of a polar material is added to the catalyst/monomer solution in order to illustrate the effect of polar material on shelf-life. In Example 13, a catalyst/monomer solution is prepared by adding 2.0 ml of a 0.1M tungsten containing catalyst solution, as described in Example 1, to 20 ml of dicyclopentadiene in a nitrogen purged tube. This mixture gelled to a non-flowing material within 24 hours. In Example 14, the same procedure is carried out except that 0.03 ml of benzonitrile is added, giving a final benzonitrile to tungsten halide ratio of 1.5:1. This mixture does not gel and is catalytically active after 4 weeks. Example 15 illustrates the result when tetrahydrofuran is added to give a tetrahydrofuran to tungsten halide ratio of 1.5:1. Again, a greatly improved storage stability is observed. The results are listed in Table 4.

TABLE 4

|  | Example 13 | Example 14 | Example 15 |
|---|---|---|---|
| Dicyclopentadiene | 130 mmol | 130 mmol | 130 mmol |
| $WCl_6$/Phenol | 0.2 mmol | 0.2 mmol | 0.2 mmol |
| Benzonitrile | — | 0.3 mmol | — |
| Tetrahydrofuran | — | — | 0.3 mmol |
| Condition after 24 hrs. | gelled | low viscosity | low viscosity |
| Condition after 4 wks. | gelled | low viscosity | low viscosity |
| Activity after 4 wks. | gelled | acceptable | acceptable |

EXAMPLES 16-18

In Examples 16-18, the concentration of di-n-butyl ether incorporated into the activator/monomer solution to serve as a moderator is varied. In Example 16, the procedure used in Example 1, is followed with the exception that 0.078 ml of n-butyl ether is substituted for the diisopropyl ether. This gives a final ratio of di-n-butyl ether to alkylaluminum of 1.5:1. In Example 17, the procedure is repeated except that 0.156 ml of di-n-butyl ether is added, giving a final ether/Al ratio of 3:1. In Example 18, sufficient di-n-butyl ether is added to bring the final ether to alkylaluminum ratio to 5:1. All the reactions in Table 3 are initiated at 25° C. In each case a solid, insoluble polymer is formed. The results of the reactions are listed in Table 5.

TABLE 5

|  | Example 16 | Example 17 | Example 18 |
|---|---|---|---|
| Dicyclopentadiene | 57.6 mmol | 57.6 mmol | 57.6 mmol |
| $WCl_6$/Phenol | 0.029 mmol | 0.029 mmol | 0.029 mmol |
| $Et_2AlCl$ | 0.29 mmol | 0.29 mmol | 0.29 mmol |
| Di-n-butyl ether | 0.43 mmol | 0.86 mmol | 1.45 mmol |
| Benzonitrile | 0.033 mmol | 0.033 mmol | 0.033 mmol |
| Ether/Al | 1.5 | 3.0 | 5.0 |
| Time to Exotherm | 36 sec. | 55 sec. | 75 sec. |
| Exotherm | 150° C. | 158° C. | 159° C. |

EXAMPLES 19-21

In Examples 19-21, the level of $Et_2AlCl$ used in the polymerization of dicyclopentadiene are varied. In Example 19, 18.5 ml of dicyclopentadiene was mixed under $N_2$ with 1.5 ml of a 1.0M solution of $Et_2AlCl$ in dicyclopentadiene and with 0.55 ml of di-n-butyl ether. Then in a $N_2$ purged tube 8.9 ml of this activator/monomer solution is mixed with 1.1 ml of a catalyst/monomer solution as described in Example 1. In Example 20, 4.5 ml of the activator/monomer solution used in Example 19 is combined with 4.4 ml of dicyclopentadiene and 1.1 ml of the catalyst/monomer solution used in Example 20. In Example 21, 2.5 ml of the activator/monomer solution used in Example 19 is combined under $N_2$ with 6.4 ml of dicyclopentadiene and 1.1 ml of the catalyst/monomer solution used in Example 19. The final compositions of these reaction mixtures are listed in Table 6. All reactions are initiated at 25° C.

TABLE 6

|  | Example 19 | Example 20 | Example 21 |
|---|---|---|---|
| Dicyclopentadiene | 72 mmol | 72 mmol | 72 mmol |
| $WCl_6$/Phenol | 0.036 mmol | 0.036 mmol | 0.036 mmol |
| $Et_2AlCl$ | 0.72 mmol | 0.36 mmol | 0.20 mmol |
| Di-n-butyl ether | 1.44 mmol | 0.72 mmol | 0.40 mmol |
| Benzonitrile | 0.04 mmol | 0.04 mmol | 0.04 mmol |
| Dicyclopentadiene/Al | 100 | 200 | 360 |
| Di-n-butyl ether/Al | 2/1 | 2/1 | 2/1 |
| Time to Exotherm | 40 sec. | 55 sec. | 144 sec. |
| Exotherm | 150° C. | 151° C. | 145° C. |

EXAMPLES 22-25

The effect of impurities on the catalyst system is illustrated in Examples 22 through 25. In Example 22, a 0.007M solution of $WCL_6$/phenol in dicyclopentadiene is prepared by mixing under nitrogen 150 ml of dicyclopentadiene with 10.8 ml of a 0.1M $WCL_6$/phenol solution in toluene and 0.11 ml of benzonitrile. Then 3.0 ml of this solution is mixed under nitrogen with 3 ml of a dicyclopentadiene solution containing $AlEt_2Cl$ at a level dicyclopentadiene to alkylaluminum of 150:1 and di-n-butyl ether at a level of ether to alkylaluminum of 1.5:1.

In Example 23, a 10 ml sample of the catalyst/monomer solution used in Example 22 is mixed with an impurity, 0.036 mmol of $H_2O$, added as a dispersion in dicyclopentadiene. One and one-half hours later, 3 ml of this mixture is mixed under nitrogen with 3.01 of the activator/monomer solution described in Example 22. The reaction is repeated this time combining the activator/monomer solution with the catalyst/monomer solution 18 hours after the $H_2O$ had been added.

Example 24 is done in the same manner as Example 23 with the exception that 0.036 mmol of tert-butyl hydroperoxide is added to a second 10 ml sample of the catalyst solution rather than $H_2O$. The reactivity of the resultant mixture is checked 1½ and 18 hours after the addition of the impurity. Example 25 is carried out in the same manner with the exception that 0.072 mmol of di-tert-butylperoxide is the impurity added initially to 10 ml sample of the catalyst/monomer solution. In every case a solid, insoluble polymer is formed.

TABLE 7

|  | Example 22 | Example 23 | Example 24 | Example 25 |
|---|---|---|---|---|
| Dicyclopentadiene | 43 mmol | 43 mmol | 43 mmol | 43 mmol |
| WCl$_6$/Phenol | 0.021 mmol | 0.021 mmol | 0.021 mmol | 0.021 mmol |
| H$_2$O | — | 0.01 mmol | — | — |
| tert-butyl-hydroperoxide | — | — | 0.01 mmol | — |
| Di-tert-butyl-peroxide | — | — | — | 0.02 mmol |
| Et$_2$AlCl | 0.14 mmol | 0.14 mmol | 0.14 mmol | 0.14 mmol |
| Added Impurity/W | 0 | 0.5/1 | 0.5/1 | 1/1 |
| Induction time after 1½ hrs. | 31 sec. | 50 sec. | 98 sec. | 33 sec. |
| Exotherm after 1½ hrs. | 173° C. | 171° C. | 168° C. | 171° C. |
| Induction time after 24 hrs. | 36 sec. | 98 sec. | 266 sec. | 73 sec. |
| Exotherm after 24 hrs. | 170° C. | 170° C. | 155° C. | 169° C. |

EXAMPLES 26–33

In each of Examples 26–33, polymerized dicyclopentadiene is made by reaction injection molding processing using a standard reaction injection molding machine. The following description illustrates the procedure for molding. First the desired amount of catalyst mixture and activator dicyclopentadiene is charged to two 2 gallon tanks. The tanks are located on different sides of the reaction injection molding machine: the tank on the A side is the one to which the activator mixture is added and the tank on the B side is the one to which the catalyst solution is added. If desired, rubber and/or organic resins are added as a predissolved solution in dicyclopentadiene. Also solid fillers are added, if desired.

The tanks are then closed off and placed under a nitrogen atmosphere. Sufficient Et$_2$AlCl is added to the activator solution feed tank (the A tank) to bring the alkylaluminum concentration to 0.048M and sufficient di-n-butyl ether to achieve an ether to alkylaluminum ratio of 1.5:1. Sufficient WCl$_6$/phenol is added to bring the concentration of the catalyst in the catalyst side (B side) to 0.007M. The catalyst solution is prepared as a 0.1M solution in toluene. All transfers are done in a way to preclude the entrance of oxygen or moisture into the system. The solution are continuously thoroughly blended in their respective tanks.

The mixing of the activator solution (A stream) and the catalyst solution (B stream) is accomplished using a standard impingement type reaction injection molding mixhead. The ratio of the activator/monomer solution mixed with catalyst/monomer solution is 1:1. The impingement mixing is accomplished by passing both the solutions through orifices 0.032″ in diameter at a flow rate approximately 80 ml/sec. This requires pumping pressure of approximately 1000 psi.

The resulting mixture flows directly into a mold heated between 50° C. and 60° C. The mold is made of aluminum and is chrome plated. The mold has a flat cavity which forms a plaque sample 10″×10″×⅛″ thick. A clamping force of 1.5 tons is used to keep the mold closed. The finished samples are removed at various times after mold filling ends.

In Example 26, the outlined molding procedure is followed where there is added 10 wt. % added styrene-butadiene-styrene rubber (Kraton no. 1102 manufactured by Shell Chemical Co). The sample is removed from the mold after 2 minutes. In Example 27 a material of the same composition as Example 26 is produced. This time the mold is opened 30 seconds after the combined streams are injected. The surface features of Example 27 are noticably better than those of Example 26. In Example 28, 10 wt. % of a thermally polymerized dicyclopentadiene resin is added in addition to both the catalyst/monomer and the activator/monomer solutions in addition to the styrene-butadiene-styrene rubber.

Various inorganic fillers are incorporated into the dicyclopentadiene polymer by adding equal amounts to both the catalyst/monomer and the activator/monomer solutions. In Example 29, samples are made containing 33 wt. % ⅛″ milled glass (P117B grade of Owens Corning Co.). These samples are made by initially slurrying the glass into both solutions of the catalyst/monomer and the activator/monomer. Otherwise, these solutions are identical to those used in Example 28. In Example 30 a composition consisting of 10 wt % wollastonite is made by adding the filler to a formulation identical to that described in Example 28. In Example 31 the same procedure is followed as in Example 30 except that a 33 wt % level of wollastonite is employed. In Example 32, 25 wt % wollastonite is added to the formulation described in Example 27. In each case a solid, insoluble polymer is formed. Representative properties of Examples 26–32 are listed in Tables 8 and 8A.

Example 33 is a reaction injection molding processed poly(dicyclopentadiene) made without any rubber additives.

TABLE 8

|  | Example 26 | Example 27 | Example 28 | Example 29 | Example 30 | Example 31 | Example 32 | Example 33 |
|---|---|---|---|---|---|---|---|---|
| Resin Composition |  |  |  |  |  |  |  |  |
| % Cyclopentadiene resin | — | — | 10 | 10 | 10 | 10 | — | — |
| % Kraton 1102 | 10 | 10 | 10 | 10 | 10 | 10 | 10 | — |
| % Dicyclopentadiene | 90 | 90 | 80 | 80 | 80 | 80 | 90 | 100 |
| Filler Composition |  |  |  |  |  |  |  |  |
| wt % ⅛″ milled glass | — | — | — | 33 | — | — | — | — |
| wt % wollastonile | — | — | — | — | 10 | 33 | 25 | — |
| Tensile Properties |  |  |  |  |  |  |  |  |
| Strength (psi) | — | 4,860 | 5,230 | — | 4,700 | — | 4,290 | 5,050 |
| Modulus (psi) | — | 262,000 | 257,000 | — | 426,000[1] | — | 683,000[1] | 270,000 |
| Elongation at yield (%) | — | 4.0 | 4.0 | — | 3.0 | — | 2.0 | 3.4 |
| Flexural Properties |  |  |  |  |  |  |  |  |
| Strength (psi) | 7,400 | 8,600 | — | 8,200 | 9,000 | 8,400 | 8,300 | 8,400 |
| Modulus (psi) | 235,000 | 250,000 | — | 526,000[2] | 390,000[2] | 670,000[2] | 480,000[2] | 270,000 |

TABLE 8-continued

| | Example 26 | Example 27 | Example 28 | Example 29 | Example 30 | Example 31 | Example 32 | Example 33 |
|---|---|---|---|---|---|---|---|---|
| Impact Properties | | | | | | | | |
| Notched Izod (ft. lb./in. notch) | 13.2 | 10.5 | 11.0 | 2.7 | 2.0 | 2.9 | — | 2.3 |
| Plate Impact at 5000"/min. (ft. #) | | | | | | | | |
| 23° C. | 21.0 | — | — | — | 11.2 | — | 11.3 | — |
| 0° C. | 15.7 | — | — | — | 12.0 | — | 11.8 | — |
| −20° C. | 12.3 | — | — | — | 11.9 | — | 12.7 | — |
| Heat Deflection Temperature at 264 psi (°C.) | — | 65° | 64° | 81° | 69° | — | 79° | 60° |
| Coefficient of Thermal Expansion (in/in °F.)[2] | — | $6.0 \times 10^{-5}$ | — | $3.2 \times 10^{-5}$ | | | | |
| Linear Mold Shrinkage (%)[2] | 2.6 | 3.5 | 3.1 | 1.0 | | | | |
| Coefficient of Thermal Expansion (in/in °F.)[1] | | | | | $5.2 \times 10^{-5}$ | — | $3.8 \times 10^{-5}$ | — |
| Linear Mold Shrinkage (%)[1] | | | | | 1.6 | 1.0 | 1.5 | — |
| Percentage Residual Monomer | 3.0 | 3.0 | 3.0 | 0.03 | 0.1 | 0.03 | 0.08 | 3.0 |

[1]Value in the direction parallel to the direction of flow.
[2]Value is the average of the values obtained perpendicular to the direction of flow and parallel to the direction of flow.

EXAMPLE 34

A catalyst component is prepared in the following manner:

In an argon filled glove box, 3.96 g of WCl$_6$ is weighed into a 10 oz. bottle. The bottle is then capped. In another 10 oz. bottle, 2.21 g (10 mmol) of nonylphenol is added. This bottle is then capped and sparged with nitrogen for 20 minutes. The nonylphenol is then dissolved in 100 ml of toluene, and the resulting solution is transferred by cannula to the bottle containing WCl$_6$. After marking the solvent level, the bottle is stirred and sparged with nitrogen for one hour. Acetylacetone, 2.0 g (20 mmol) is then added by syringe and the mixture is sparged rapidly and stirred overnight. Toluene is then added to restore the solvent level and the resulting solution is divided among ten 4" polyethylene tubes that are capped and sparged. These are stored under nitrogen.

An activator component is prepared in the following manner:

A 4" glass polymerization tube is capped and sparged. 8 ml of toluene is syringed into the tube. 2.0 ml of a 1.8M solution of diethyl aluminum chloride in toluene is added by a syringe. 0.49 g of butyl ether is then added by syringe.

The polymerization is accomplished in the following manner:

A 15×125 mm test tube is capped with a rubber stopper and sparged with N$_2$. The tube is then charged with 5 ml of dicyclopentadiene. 0.19 ml of the catalyst component and 0.038 g of butyl ether are added by syringe. Then, 0.15 ml of the activator component was added by syringe and the sample is shaken several times to mix the components. The mixture is allowed to stand and polymerize.

The percent gel swell is determined by the following method:

A 5 g sample of the polymer was broken out of its test tube and sliced into approximately 1 cm × 1.3 cm diameter cylinders. Each slice was then weighed and placed on a stainless steel wire. The wire and sample are hung in about 50 ml of toluene in a 1 liter round bottom flask and the toluene is allowed to reflux overnight. After cooling, the samples are removed from the flask, patted dry, and weighed. Percent swell is determined according to the following equation:

$$\text{Percent Swell} = \frac{\text{Final polymer weight} - \text{initial polymer weight}}{\text{initial polymer weight}} (100)$$

It is found that the sample has a percent swell of 110%.

EXAMPLE 35

The procedure of Example 34 is followed except that a noncycloolefin-solvent-free mixture of WCl$_6$ and WCl$_4$O in a 1:1 ratio stabilized by 2,4-pentanedione is used as the catalyst in place of WCl$_6$ and polymerization is by simultaneously injection of a mixture of half of the dicyclopentadiene and the catalyst and a mixture of half of the dicyclopentadiene and the activator component into a mold to form a flat plate of substantially cross-linked solid thermoset polymer product. The procedure of Example 35 is repeated with the addition of 20% milled glass.

The product polymer of the invention as produced in Example 35 has an unusual balance of high modulus along with low residual monomer and good impact properties as shown in Table 9.

The plate impact strength for unfilled material is about 9.6 to 11.8 ft. lbs. This decreases to only about 8.1 to 9.6 ft. lbs. at −29° C. Impact failure is by ductile break at room temperature and approaches the brittle/ductile transition region at −29° C. The impact for 20% milled glass-filled material is about 8.1 to 9.6 ft. lbs. at both ambient temperatures and −29° C. In this case, the low-temperature failure is by brittle fracture.

In addition to beneficial physical properties, poly(dicyclopentadiene) exhibits excellent paintability characteristics. This is somewhat surprising considering the hydrophobic nature of the polymer. Formulations to provide flame-retardant properties have also been developed.

TABLE 9

| Poly(dicyclopentadiene) Properties | | | |
|---|---|---|---|
| | Direction to Flow | Unfilled | 20% Milled Glass[a] |
| Flexural modulus, MPa | Parallel | 2,070 | 2,900 |
| | Perpendicular | | 2,480 |
| Flexural strength, MPa | Parallel | 62 | 62–76 |
| | Perpendicular | | 62 |
| Tensile modulus, MPa | | 1,620 | |
| Tensile strength, MPa | Parallel | 34 | 31 |

TABLE 9-continued

| Poly(dicyclopentadiene) Properties | | | |
| --- | --- | --- | --- |
|  | Direction to Flow | Unfilled | 20% Milled Glass[a] |
| Tensile elongation, % | Parallel | 80 | 25 |
| Glass transition temperature, °C. |  | 90 |  |
| Heat sag, 152 mm OH, 1 hr., 135° C., mm | Parallel | 61 | 10–20 |
|  | Perpendicular |  | 15–30 |
| Coefficient of linear expansion, mm/mm/°C. | Parallel | $37 \times 10^{-6}$ | $17 \times 10^{-6}$[b] |
|  | Perpendicular |  | $34 \times 10^{-6}$[b] |
| Mold shrinkage, cm/cm | Parallel | 0.035 | 0.008 |
|  | Perpendicular |  | 0.021 |
| Plate Impact Resistance, ft. lbs. |  |  |  |
| 23° C. |  | 9.6–11.8 | 8.1–9.6 |
| −29° C. |  | 8.1–9.6 | 8.1–9.6 |
| Flash Point: |  |  |  |
| Catalyst mixture with dicyclopentadiene |  | 101 | 101 |
| Activator mixture with dicyclopentadiene |  | 100 | 100 |

[a] 1/16 in. OCF 737.
[b] Retained on recycle.

What I claim is:

1. A substantially crosslinked thermoset polymer comprising polymerized units of dicyclopentadiene, said homopolymer being characterized as having a flexural modulus of at least 150,000 psi at ambient temperature, a notched Izod impact strength of at least about 1.2 ft. lb./in. notch, a plate impact strength at 23° C. of at least about 5 ft. lb. and a percent swell in toluene of less than 200%.

* * * * *